Patented May 24, 1938

2,118,192

UNITED STATES PATENT OFFICE 2,118,192

MIXTURES OF DYESTUFFS

Robert Grether, Wilhelmsbad, near Hanau-on-the-Main, Germany, assignor to General Aniline Works, Inc., New York, N. Y., a corporation of Delaware No Drawing. Application July 16, 1936, Serial No. 90,893. In Germany August 6, 1935

4 Claims. (Cl. 8—6)

My present invention relates to new mixtures comprising dyestuffs of at least one member of the group consisting of the dibenzanthrone and isodibenzanthrone series and of dyestuffs of a member of the group consisting of alkaline condensation products of 1-(Bz$_1$-benzanthronyl amino)-acylaminoanthraquinones (cf. U. S. Patents Nos. 1,850,562, 1,877,947, 2,022,240 and 2,040,380) and of alkaline condensation products of polyanthraquinonylaminobenzanthrones, containing one anthraquinonyl radicle in the Bz$_1$-position, cf. British specification No. 337,741.

The dyeings and prints obtained with the above mixtures yield full black shades of an excellent fastness, particularly to washing and boiling sodium carbonate solution, and to an increased degree to light.

The shade may be varied by adding further dyestuffs. The processes of dyeing and printing using the above mixture of dyestuffs are carried out in the manner customary for vat dyestuffs.

Further, in accordance with my present invention mixtures of the dyestuffs of the above types may be produced in the dyeing liquor or printing paste and the dyeing or printing likewise effected in the customary manner.

In order to further illustrate my invention the following examples are given, the parts being by weight and all temperatures in degrees centigrade. However, I wish it to be understood that my invention is not limited to the particular products nor reaction conditions mentioned therein.

Example 1

3 parts of the dyestuff obtained by acting with sulfurylchloride on the benzoylated alkaline condensation product of Bz$_1$-benzanthronyl-1-amino-5-aminoanthraquinone (cf. U. S. Patent No. 2,022,240) are mixed with 2.3 parts of 2.2'-Bz-1'-dibenzanthrone. On dyeing 100 parts of cotton with this mixture a bright bluish black shade is obtained.

Example 2

2.7 parts of the dyestuff cited in Example 1 are mixed with 2.3 parts of 2.2'-Bz-1'-dibenzanthrone and 0.5 part of the bluish red dyestuff obtained by introducing two ethyl groups into dipyrazolanthrone. On dyeing 100 parts of cotton with this mixture a bright violetish black shade is obtained.

Example 3

3.9 parts of the dyestuff cited in Example 1 are mixed with 2.1 parts of the dyestuff indanthrene-brilliant violet RR (Schultz, No. 1,265), which appertains to the isodibenzanthrone series. On dyeing 100 parts of cotton with this mixture a reddish black shade is obtained.

Example 4

With a mixture of 3.6 parts of the dyestuff cited in Example 1 and 1.5 parts of tribromoisodibenzanthrone on 100 parts of cotton a bright neutral black shade is obtained.

Example 5

With a mixture of 4.2 parts of the dyestuff cited in Example 1 and 3.6 parts of the blue dyestuff of the dibenzanthrone series obtained by acting with bromine on dibenzanthrone in the presence of chlorosulfonic acid on 100 parts of cotton a very full greenish black shade is obtained.

Example 6

When dyeing from the vat 100 parts of viscose-artificial silk with a mixture of 2 parts of the olive dyestuff obtained by benzoylating the alkaline condensation product of Bz$_1$-benzanthronyl-1-amino-5-aminoanthraquinone and of 1.5 parts of 2.2'-Bz-1'-dibenzanthrone a bright bluish black shade is obtained whereas a mixture of 2.3 parts of the olive and 1.3 parts of the blue dyestuff yields a full greenish black shade.

Example 7

3.6 parts of the alkaline condensation product of di-(1'-anthraquinonyl)-6-Bz$_1$-diaminobenzanthrone are mixed with 1.8 parts of 2.2'-Bz-1'-dibenzanthrone. When dyeing 100 parts of cotton with this mixture a violet black shade is obtained.

Example 8

When dyeing 100 parts of cotton with a mixture of 3.6 parts of the dyestuff cited in Example 7 and of 0.7 part of tribromoisodibenzanthrone a neutral black shade is obtained.

Example 9

When dyeing 100 parts of cotton with a mixture of 3.2 parts of the dyestuff cited in Example 7 and of 1.6 parts of the blue dyestuff obtained by acting with bromine on dibenzanthrone in the presence of chlorosulfonic acid a bluish black shade is obtained.

I claim:

1. Mixtures of dyestuffs comprising dyestuffs of at least one member of the group consisting of the dibenzanthrone and isodibenzanthrone series, and of dyestuffs of a member of the group consisting of alkaline condensation products of 1-(Bz$_1$-benzanthronylamino)-acylaminoanthraquinones and of alkaline condensation products of polyanthraquinonylaminobenzanthrones, containing one anthraquinonyl radicle in the Bz$_1$-position, which mixtures yield on dyeing and printing vegetable fibers therewith full black shades of an excellent fastness, particularly to washing and boiling sodium carbonate solutions, and to an increased degree to light.

2. A mixture of dyestuffs consisting of 3 parts of the dyestuff obtained by acting with sulfurylchloride on the benzoylated alkaline condensation product of Bz$_1$-benzanthronyl-1-amino-5-aminoanthraquinone and 2.3 parts of 2.2'-Bz-1'-dibenzanthrone, which mixture yields bright bluish black shades on cotton.

3. A mixture of 2 parts of the olive dyestuff obtained by benzoylating the alkaline condensation product of Bz$_1$-benzanthronyl-1-amino-5-aminoanthraquinone and 1.5 parts of 2.2'-Bz-1'-dibenzanthrone, which mixture yields full greenish black shades on cotton.

4. A mixture of 3.6 parts of the alkaline condensation product of di-(1'-anthraquinonyl)-6-Bz$_1$-diaminobenzanthrone and 1.8 parts of 2.2'-Bz-1'-dibenzanthrone, which mixture yields violetish black shades on cotton.

ROBERT GRETHER.